US008968149B2

(12) United States Patent
Walliser et al.

(10) Patent No.: US 8,968,149 B2
(45) Date of Patent: Mar. 3, 2015

(54) WIND TURBINE GEAR MECHANISM

(75) Inventors: Jochen Walliser, Friedrichshafen (DE); Alfred Kienzle, Frickingen (DE); Tino Kirschner, Friedrichshafen (DE); Knud Erik Petersen, Holstebro (DK)

(73) Assignees: ZF Friedrichshafen AG, Friedrichshafen (DE); Vestas Wind Systems A/S, Aarhus N (DK)

( * ) Notice: Subject to any disclaimer, the term of this patent is extended or adjusted under 35 U.S.C. 154(b) by 0 days.

(21) Appl. No.: 14/115,897

(22) PCT Filed: Mar. 20, 2012

(86) PCT No.: PCT/EP2012/054855
§ 371 (c)(1),
(2), (4) Date: Jan. 23, 2014

(87) PCT Pub. No.: WO2012/156128
PCT Pub. Date: Nov. 22, 2012

(65) Prior Publication Data
US 2014/0128213 A1 May 8, 2014

(30) Foreign Application Priority Data
May 19, 2011 (DE) .......................... 10 2011 076 114

(51) Int. Cl.
*F16H 1/46* (2006.01)
*F03D 11/02* (2006.01)
(Continued)

(52) U.S. Cl.
CPC *F16H 1/46* (2013.01); *F03D 11/02* (2013.01); *F16H 37/041* (2013.01); *F16H 57/02* (2013.01);
(Continued)

(58) Field of Classification Search
None
See application file for complete search history.

(56) References Cited

U.S. PATENT DOCUMENTS

| 2,911,845 A | 11/1959 | North |
| 6,761,082 B2 | 7/2004 | Hulshof |
| 2011/0008168 A1* | 1/2011 | Fuglsang-Petersen et al. .......................... 416/170 R |

FOREIGN PATENT DOCUMENTS

| CN | 2 580 136 Y | 10/2003 |
| CN | 201 129 406 Y | 10/2008 |

(Continued)

OTHER PUBLICATIONS

German Search Report Corresponding to 10 2011 076 114.4 mailed May 30, 2012.
International Search Report Corresponding to PCT/EP2012/054855 mailed May 3, 2012.
Written Opinion Corresponding to PCT/EP2012/054855 mailed May 3, 2012.

*Primary Examiner* — Robert A Siconolfi
*Assistant Examiner* — Huan Le
(74) *Attorney, Agent, or Firm* — Davis & Bujold, PLLC; Michael J. Bujold

(57) ABSTRACT

A wind turbine gear mechanism with a planetary gear stage arranged on the drive input side and with first and second spur gear stages arranged, in a gear mechanism housing, downstream of the planetary gear stage. The first spur gear stage rotationally and functionally connects a sun gear shaft of the planetary gear stage to an intermediate shaft, the second spur gear stage rotationally and functionally connects the intermediate shaft to a drive output shaft, and only one intermediate shaft is provided. In this case, the gear mechanism housing has a separation joint along which the gear mechanism housing can be divided into a main housing portion and a housing cover in such manner that a separation joint plane passes through the central axis of the intermediate shaft and the separation joint plane extends a distance away from the central axis of the sun gear shaft.

7 Claims, 3 Drawing Sheets

(51) Int. Cl.
*F16H 37/04* (2006.01)
*F16H 57/02* (2012.01)

(52) U.S. Cl.
CPC .................. *F05B 2260/40311* (2013.01); *F16H 2057/02078* (2013.01); *F16H 2057/02008* (2013.01); *Y02E 10/722* (2013.01)
USPC ........................................ 475/343; 74/606 R

(56) References Cited

FOREIGN PATENT DOCUMENTS

| | | |
|---|---|---|
| DE | 101 59 973 A1 | 6/2003 |
| EP | 1 279 867 A2 | 1/2003 |
| EP | 1 619 386 A2 | 1/2006 |

\* cited by examiner

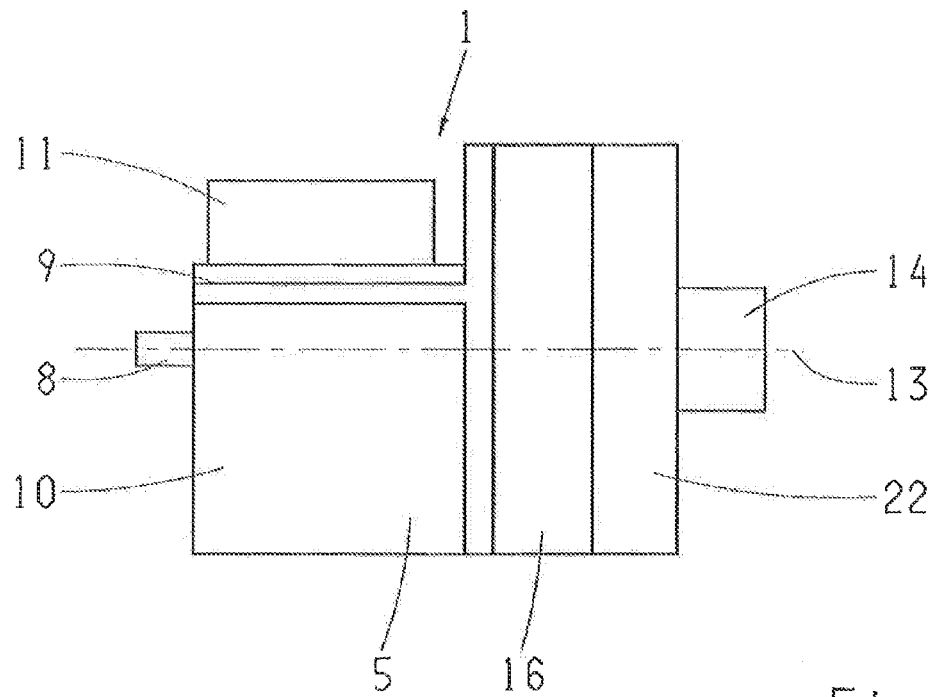
Fig. 2
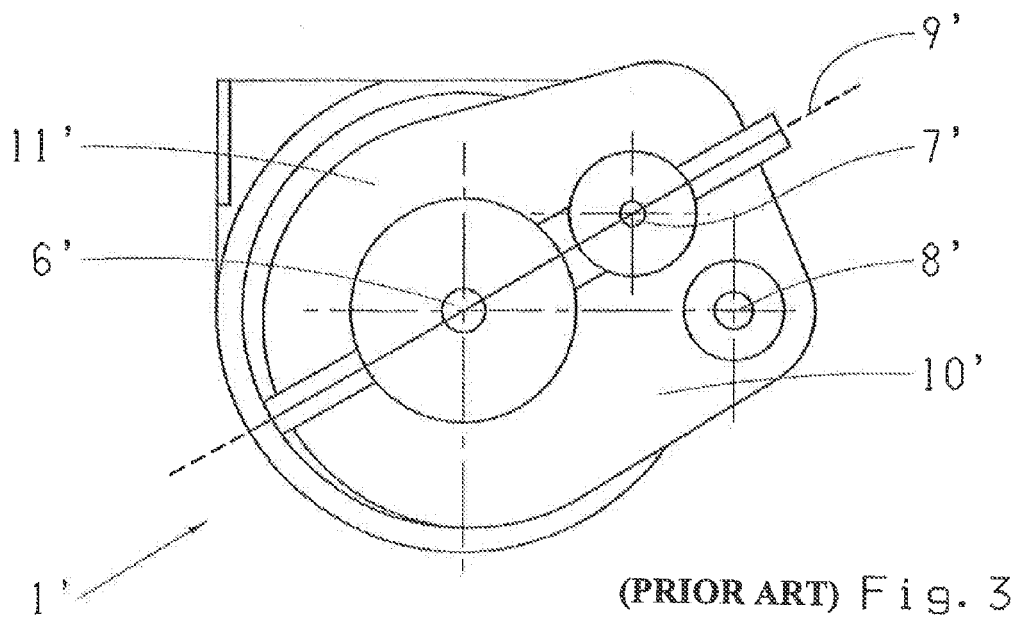
(PRIOR ART) Fig. 3

WIND TURBINE GEAR MECHANISM

This application is a National Stage completion of PCT/EP2012/054855 filed Mar. 20, 2012, which claims priority from German patent application serial no. 10 2011 076 114.4 filed May 19, 2011.

FIELD OF THE INVENTION

The present invention concerns a wind turbine gear mechanism,

BACKGROUND OF THE INVENTION

In the case of gear mechanisms in the drive-train of wind turbines simple servicing and maintenance are particularly important, because owing to their exposed position at the tip of a tower that can be up to 100 meters tall or more, the boundary conditions existing for wind turbines are exceptionally difficult. Furthermore, the size and mass of a typical gear mechanism in the drive-train of a wind turbine with a power of several megawatts are so large that even owing to the mass and size of the individual components, the effort and complexity involved, for example for the safe and efficient replacement of components are very substantial.

Known gear mechanisms in drive-trains of wind turbines often comprise a planetary gear stage on the drive input side and a number of spur gear stages on the drive output side, such that each transmission stage increases the rotational speed of the shafts in order to, starting from the slowly rotating rotor shaft of the wind turbine, finally produce higher rotational speeds at the generator which are suitable for electric power generation. In particular, the faster-running spur gear stages on the drive output side in such wind turbine gear mechanisms require regular servicing and more frequent maintenance work, involving the replacement of gear components.

DE 101 59 973 A1 describes a wind turbine gear mechanism having a planetary gear stage arranged on the rotor or drive input side and two spur gear stages arranged on the drive output or generator side. In this case, power branching to two intermediate shafts is provided in the first spur gear stage. The wind turbine gear mechanism designs proposed in DE 101 59 973 A1 comprise, among other things, a number of housing component joints in the housing for the spur gear stages on the output side. However, the gear mechanism housing portion of the spur gear stages is divided into so many housing portions that the manufacturing and assembly costs and complexity are comparatively high.

Besides the above, other systems also are known in which the central axes of two mutually parallel transmission shafts of a wind turbine gear mechanism are located in a common plane with a separation joint of the gear mechanism housing. This arrangement has the advantage that once the parts of the housing have been separated both of the transmission shafts can be fitted in the one separation plane. However, in the known arrangements of this type large wind turbines have two gear mechanism housing halves which are too heavy and/or too large to be separated and detached from one another in situ, i.e. in the gondola on the tower of the wind turbine. With such gear mechanism housing structures a separate crane is needed to enable the replacement of gear mechanism components, which lifts the components up from the ground. This entails considerable costs.

SUMMARY OF THE INVENTION

The purpose of the present invention is to provide a wind turbine gear mechanism having a planetary gear stage on the drive input side and two spur gear stages on the drive output side, in which all the parts of a fast-running spur gear stage can be replaced in situ on the tower of the wind turbine, which entails having as simple a structure as possible, one which is inexpensive to construct and can be assembled easily.

This objective is achieved by a wind turbine gear mechanism according to the developments of the invention.

The wind turbine gear mechanism according to the invention comprises a planetary gear stage arranged on the drive input side and a first and a second spur gear stage, the two spur gear stages being arranged in the force flow downstream from the planetary gear stage in a gear mechanism housing. A transmission input shaft connected in a rotationally fixed manner to the rotor of the wind turbine constitutes the slow rotating input shaft of the planetary gear stage. In a rotationally functional manner the first spur gear stage connects an output shaft of the planetary gear stage, namely the sun gear shaft, to an intermediate shaft. In turn the second spur gear stage connects the intermediate shaft in a rotationally functional manner to a drive output shaft. Only one intermediate shaft is provided. The drive output shaft is functionally connected to at least one generator of the wind turbine. Typically the rotational speed of the shafts become higher with each successive transmission stage in order, starting from the slowly rotating rotor of the wind turbine, finally to produce higher rotational speeds at the generator that are suitable for generating electric power.

According to the invention, the gear mechanism housing has a separation joint along which the gear mechanism housing is divided into a main housing portion and a housing cover, such that the separation joint plane extends through the central axis of the intermediate shaft whereas the separation joint plane is positioned a distance away from the central axis of the sun gear shaft, so that compared with the designs known from the prior art only one transmission shaft of the spur gear stages, namely the intermediate shaft, is located in the same plane as the separation joint.

The easy replacement of most parts of the spur gear stages in situ is made possible, on the one hand, because once the light housing cover has been lifted off, the intermediate shaft with its bearing components can be replaced through the opening provided thereby, and on the other hand because the drive output shaft, which is the pinion shaft of the second spur gear stage, is designed such that the pinion shaft together with its mountings can be extracted in the axial direction. Compared with the designs known from the prior art the housing cover can be made lighter and smaller, because the separation joint plane extends through the central axis of only one transmission shaft, namely the intermediate shaft. Correspondingly, with regard to its size and mass, the housing cover is preferably designed such that the housing cover and the intermediate shaft can be removed from the wind turbine gear mechanism in situ. For example, the mass of the housing cover can be only so large as to enable it to be lifted and transported by an on-board crane with a limited lifting capacity, mounted in or on the gondola of the wind turbine.

The separation joint of the wind turbine gear mechanism housing is preferably positioned above the sun gear shaft so that the housing cover can be lifted off, for example by the on-board crane of the gondola. The separation of the housing and the vertical lifting of the housing cover are further facilitated if the separation plane extends at least nearly horizontally. It is also conceivable for the separation plane to be positioned at a lower level than the sun gear shaft, and in that case the housing cover can be lowered downward.

To ensure that gear mechanism components can be exchanged from the gear mechanism in a simple manner, the mass of the housing cover is preferably at most half as much as the mass of the main housing portion.

Preferably the main portion of the housing has a connection flange, for example a screw flange, to enable connection to a counter-flange on a housing component of the planetary gear stage. For maintenance measures in the spur gear stages, however, the gear mechanism housing does not have to be separated from the planetary gear stage housing because almost all the components of the two spur gear stages are accessible and can be replaced by removing the housing cover of the gear mechanism housing.

BRIEF DESCRIPTION OF THE DRAWINGS

The invention will now be explained in more detail with reference to an example embodiment illustrated in the figures below, which show:

FIG. 2: A side view of a wind turbine gear mechanism according to the invention, FIG. 3: A view of a wind turbine gear mechanism of the prior art, seen from the drive output side.

DETAILED DESCRIPTION OF THE PREFERRED EMBODIMENTS

Figure 1:
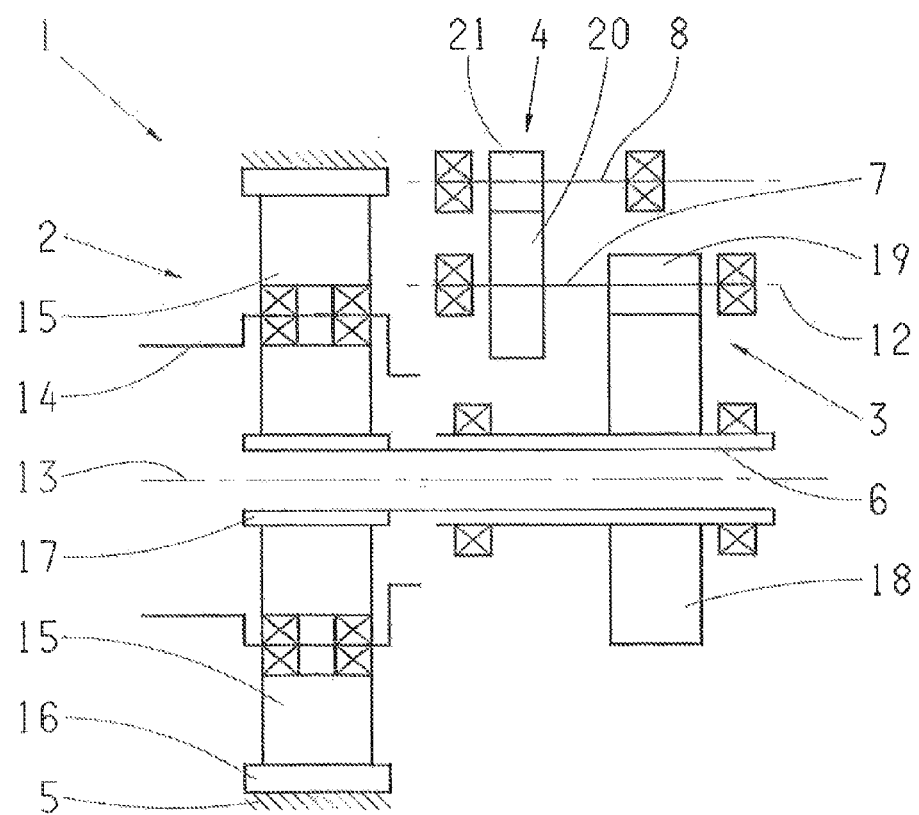
FIG. 1: The structure of a wind turbine gear mechanism according to the invention, represented schematically.

The principle of the structure of a wind turbine gear mechanism 1 that is relevant for the present invention is illustrated in FIG. 1. The planetary carrier 14 of a planetary gear stage 2 arranged on the input side is connected fixed to the rotor (not shown) of the wind turbine. A number of planetary gearwheels 15 are mounted to rotate on the planetary carrier 14 and engage with the ring gear 16 and with the sun gear 17. The ring gear is connected fixed to the gear mechanism housing 5. The sun gear 17 is connected fixed to the sun gear shaft 6, which is mounted to rotate in the gear mechanism housing about a central axis 13.

Connected fixed to the sun gear shaft 6 is a first spur gear 18 of a first spur gear stage 3. The first spur gear 18 engages with a second spur gear 19 of the first spur gear stage 3, this second spur gear 19 being connected fixed to an intermediate shaft 7. The intermediate shaft 7 is mounted to rotate in the housing about its central axis 12. The central axis 12 of the intermediate shaft and the central axis 13 of the sun gear shaft are arranged parallel to one another.

A second spur gear stage 4 comprises two spur gears 20 and 21, of which the spur gear 20 on the drive input side is connected fixed to the intermediate shaft 7 whereas the spur gear 21 on the drive output side is fixed on a drive output shaft 8. The spur gear 21 on the output side can even be made integrally with the drive output shaft 8.

FIG. 2 shows the wind turbine gear mechanism 1 in which the hub of the planetary carrier 14 of the planetary gear stage 2 to which the rotor (not shown) of the wind turbine is fixed, is arranged on the drive input side. The gear mechanism housing 5 consists of at least two parts, namely the main housing portion 10 and the housing cover 11. Between the main housing portion 10 and the housing cover 11 extends the separation joint 9. At the end of the wind turbine gear mechanism 1 on the drive output side, the output shaft 8 projects out of the gear mechanism housing 5 and is in driving connection with the rotor of a generator of the wind turbine.

The main housing portion 10 in which the spur gear stages 3 and 4 are arranged can also comprise a housing of the planetary gear stage 2 and can be formed integrally with that housing. In the embodiment according to FIG. 2, for example, the main housing portion 10 of the spur gearset is formed integrally with the output-side housing component of the planetary gear stage 2. The ring gear 16 and a rotor-side housing portion 22 of the planetary gear stage 2 form further parts of the gear mechanism housing as a whole.

In the representation shown in FIG. 2 it can be seen that compared with the main housing portion 10, the housing cover 11 is substantially smaller and therefore weighs much less, so that it can be manipulated relatively easily for servicing and maintenance purposes. In this embodiment the mass of the housing cover 11 is less than half that of the main housing portion 10, so that the housing cover 11 can be manipulated easily. For example, it can be lifted off by an on-board crane fitted on the gondola of the wind turbine.

In contrast, FIG. 3 shows the arrangement of a separation joint 9' in a housing of a wind turbine gear mechanism 1' of the prior art, in which the separation joint plane 9' extends through the central axes of two mutually parallel transmission shafts 6' and 7', which results in substantially larger dimensions and a substantially greater mass of the gear mechanism cover 11'. In this case the separation joint 9' is co-planar with the central axes of the sun gear shaft 6' and the intermediate shaft 7'. It is true that once the gear mechanism cover 11' has been removed the two transmission shafts 6' and 7' are accessible, but due to its large dimensions and mass the gear mechanism cover 11' can no longer be manipulated easily.

Figure 4:
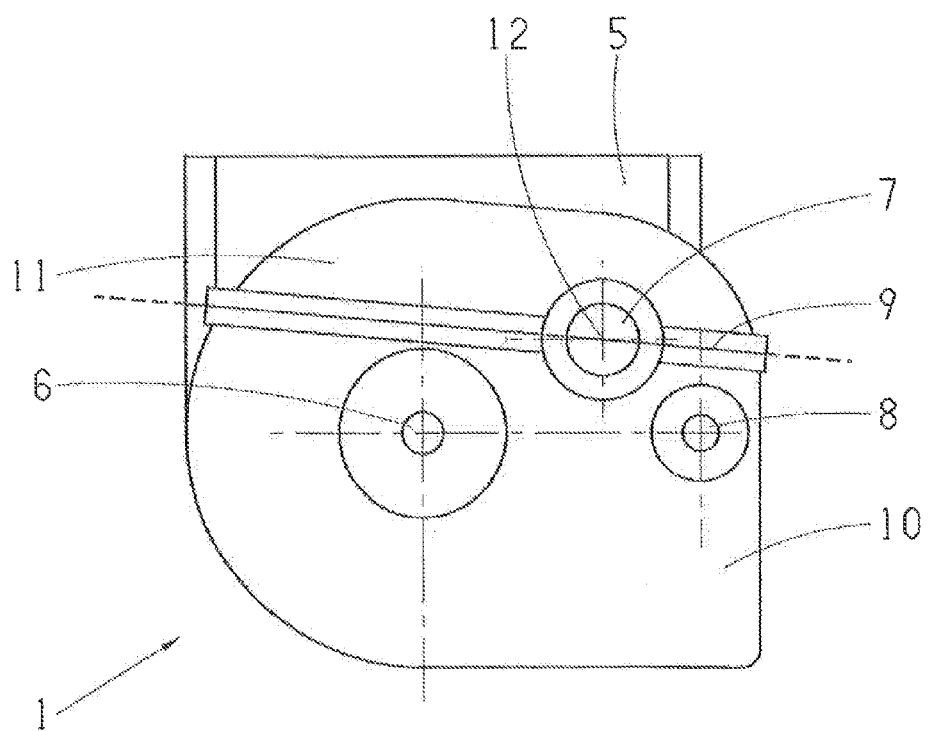
FIG. 4: A view of a wind turbine gear mechanism according to the invention, seen from the drive output side.

FIG. 4 shows the arrangement according to the invention as viewed in the direction from the drive output or generator side. The gear mechanism housing 5 as a whole consists of at least two parts, namely the main housing portion 10 and the housing cover 11. The separation joint 9 extends between the main housing portion 10 and the housing cover 11. Here too it can be seen that compared with the main housing portion 10 the housing cover 11 is substantially smaller and therefore weighs much less, so that it can be manipulated comparatively easily for servicing and maintenance purposes.

From this viewpoint the central axes of the three transmission shafts, namely the sun gear shaft 6, the intermediate shaft 7 and the drive output shaft 8, form a triangle with the central axis 12 of the intermediate shaft 7 at the apex of the triangle. The separation joint plane 9 passing through that point extends almost horizontally. This enables the housing cover 11 to be lifted off vertically in a simple manner. Once the housing cover 11 has been removed, the complete shaft assembly of the intermediate shaft 7 can be removed. Furthermore, when the housing cover 11 is removed access to the interior of the gear mechanism is greatly facilitated. A further advantage of this configuration is that the oil sump is located exclusively in the lower part of the gear mechanism housing 5, whereby the risk of a leak in the area of the separation joint 9 is reduced.

INDEXES

1 Wind turbine gear mechanism
2 Planetary gear stage
3 First spur gear stage
4 Second spur gear stage
5 Gear mechanism housing
6 Sun gear shaft
7 Intermediate shaft
8 Drive output shaft
9 Separation joint
10 Main housing portion
11 Housing cover 12 Central axis of the intermediate shaft
13 Central axis of the sun gear shaft
14 Planetary carrier
15 Planetary gearwheel
16 Ring gear
17 Sun gear
18 Spur gear
19 Spur gear
20 Spur gear
21 Spur gear
22 Housing portion of the planetary gear stage on the rotor side

The invention claimed is:

1. A wind turbine gear mechanism (1) with a planetary gear stage (2) on a drive input side and with a first spur gear stage (3) and a second spur gear stage (4), which are arranged in a gear mechanism housing (5) downstream of the planetary gear stage (2),
the first spur gear stage (3) connecting a sun gear shaft (6) of the planetary gear stage (2), in a rotationally functional manner, to an intermediate shaft (7),
the second spur gear stage (4) connecting the intermediate shaft (7), in a rotationally functional manner, to a drive output shaft (8), and only one intermediate shaft (7) being provided,
the gear mechanism housing (5) having a separation joint (9) along which the gear mechanism housing (5) can be separated into a main housing portion (10) and a removable housing cover (11) so that an entire central axis (12) of the intermediate shaft (7) being coincident with a separation joint plane (9), and
the separation joint plane (9) being parallel to a central axis (13) of the sun gear shaft (6) but spaced from the sun gear shaft (6).

2. The wind turbine gear mechanism according to claim 1, wherein the removable housing cover (11) has a size and a mass so that the removable housing cover (11) and the intermediate shaft (7) can be taken off the wind turbine gear mechanism (1).

3. The wind turbine gear mechanism according to claim 2, wherein the mass of the removable housing cover (11) is at most half a mass of the main housing portion (10).

4. The wind turbine gear mechanism according to claim 1, wherein the separation joint (9) is located above the sun gear shaft (6) when the wind turbine gear mechanism (1) is in its assembled condition.

5. A wind turbine gear mechanism (1) comprising a planetary gear stage (2) arranged on a drive input side of the wind turbine gear mechanism, and a first spur gear stage (3) and a second spur gear stage (4) which are arranged in a gear mechanism housing (5), downstream of the planetary gear stage (2),
the first spur gear stage (3) connecting a sun gear shaft (6) of the planetary gear stage (2), in a rotational manner, to an intermediate shaft (7),
the second spur gear stage (4) connecting the intermediate shaft (7), in a rotational manner, to a drive output shaft (8), and only one intermediate shaft (7) being provided,
the gear mechanism housing (5) having a separation joint (9) along which the gear mechanism housing (5) is separable into a main housing portion (10) and a removable housing cover (11) and an entire central axis (12) of the intermediate shaft (7) being coincident with a separation joint plane (9) and being parallel to a central axis (13) of the sun gear shaft (6) but spaced from the central axis (13) of the sun gear shaft (6).

6. A wind turbine gear mechanism (1) comprising:
a drive input planetary gear stage having a sun gear fixed to a sun gear shaft, a ring gear fixed to a housing of the wind turbine gear mechanism and a carrier rotationally supporting planet gears, rotational drive being input to the wind turbine gear mechanism within the housing via the carrier which drives the planet gears and the sun gear so that the sun gear shaft rotates about a first rotational axis;
a first spur gear stage comprising a first spur gear rotationally fixed to the sun gear shaft of the drive input planetary gear stage and a second spur gear rotationally fixed to an intermediate shaft, and the intermediate shaft being driven by the first spur gear stage so as to rotate about a second rotational axis;
a second spur gear stage comprising a third spur gear that is rotationally fixed to the intermediate shaft and a fourth spur gear that is rotationally fixed to a drive output shaft, the output shaft being driven by the second spur gear stage to rotate about a third rotational axis, and the rotational drive of the wind turbine gear mechanism being output from the housing via the output shaft; and
the housing comprising a main housing portion and a cover which mate with each other along a separation joint, the separation joint defines a plane, the first, the second and the third rotational axes extending parallel to and being laterally spaced from one another, the second rotational axis being coincident with the plane defined by the separation joint while the first and the second rotational axes are spaced from the plane defined by the separation joint.

7. The wind turbine gear mechanism according to claim 6, wherein a mass of the cover is at most half of a mass of the main housing portion.

\* \* \* \* \*